United States Patent
Gabhart

(10) Patent No.: US 7,467,707 B1
(45) Date of Patent: Dec. 23, 2008

(54) CONVEYOR BELT SUPPORT APPARATUS

(76) Inventor: Warren T. Gabhart, 170 Jim Ct., Louisville, KY (US) 40229

( * ) Notice: Subject to any disclaimer, the term of this patent is extended or adjusted under 35 U.S.C. 154(b) by 0 days.

(21) Appl. No.: 11/803,876

(22) Filed: May 15, 2007

Related U.S. Application Data

(60) Provisional application No. 60/800,367, filed on May 15, 2006.

(51) Int. Cl.
*B65G 15/08* (2006.01)
(52) U.S. Cl. .................. 198/818; 198/826; 198/861.1
(58) Field of Classification Search ............. 198/818, 198/820, 822, 826, 861.1
See application file for complete search history.

(56) References Cited

U.S. PATENT DOCUMENTS 2,427,590 A * 9/1947 Conners ................. 198/826
5,988,360 A * 11/1999 Mott ...................... 198/823
6,543,607 B2 * 4/2003 Fischer et al. ........... 198/826
6,634,490 B2 * 10/2003 Fischer et al. ........... 198/826
2002/0011400 A1 * 1/2002 Burkhart et al. ......... 198/818

FOREIGN PATENT DOCUMENTS

GB            2167369       *  5/1986  ............ 198/818

* cited by examiner

*Primary Examiner*—James R Bidwell
(74) *Attorney, Agent, or Firm*—George Morgan; Mark A. Manley

(57) ABSTRACT

A conveyor support apparatus comprising adjustable stanchions with slots or holes; bars, each bar comprising a wear surface and an impact cushion; a frame; brackets; cross members; and lock bolts. The bars can be parallel to or perpendicular to the direction of conveyor belt travel.

16 Claims, 8 Drawing Sheets

CONVEYOR BELT SUPPORT APPARATUS

CROSS REFERENCES TO RELATED APPLICATIONS

Provisional Application for Patent No. 60/800,367, filed May 15, 2006 with the same title, "Conveyor Belt Support Apparatus, which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

This invention relates to a conveyor belt support apparatus such as, but not restricted to, used for support of conveyor belts conveying rock or coal, especially in underground mines, quarries, and power plants.

2. Background Information

Currently, conveyor belts are supported by idler rolls or by slides or a combination thereof.

Shortcomings include high roller bearing failure rates due to moisture, dust, dirt, and other contaminants. Slides wear away quickly from sliding abrasion as a result of contaminants getting between a conveyor belt and the slides.

Replacement of the idler rolls and slides requires a cutting torch and a welder. In underground coal mines the presence of explosive gases is a constant danger, so roller assemblies must be removed from service and taken to a safe place above ground to replace worn out components. This is time consuming and expensive.

In conveyor installations in coal mines, either slots are used or holes are burned as needed for adjusting conveyor belt support stanchions. Slots tend to permit angular adjustments to stanchions to slip, requiring readjustments over time. However, burning holes as required, instead of slots, is not permitted in methane atmospheres which are often found in underground coal mines. So, the conveyor section must be taken above ground if holes are required to be burned into stanchions.

As will be seen by the subsequent description of the preferred embodiments of the present invention, the present invention overcomes shortcomings of prior art.

SUMMARY OF THE INVENTION

The preferred embodiment of the present invention, a conveyor belt support apparatus comprises adjustable stanchions with slots or holes; with belt slide bars, each of which bars comprising a wear surface and an impact cushion which comprises a sliding T nut channel clearance; a frame; brackets; cross members; and bolt locks.

The design of the cross members and the stanchions allow mounting belt slide bars either parallel or perpendicular to the direction of belt travel.

The wear surface and the sliding T nut channel in the sliding T nut channel clearance are hot press vulcanized to the impact cushion.

The cross members support the adjustable stanchions, each of which stanchions has either a slot or holes, permitting angular adjustment of the stanchions. The stanchions are assembled between the cross members and each stanchion rotates about a pivot clearance. A lock bolt through the beam and the slot of each stanchion secures the given stanchion in its angularly adjusted position. An alternative to the slots are predrilled holes at angles from 0 to 35 degrees at 5 degree increments. While the two common angles are 20 and 35 degrees, providing holes from 20 to 35 degrees at 5 degree increments has some advantages, such as, but not restricted to, permitting finer adjustments.

When the belt slide bars are mounted perpendicular to the direction of belt travel, one of the belt slide bars is offset from the other bars. Each of two stanchions assembled within the cross members support a bar. The stanchion is attached to, and rotates around a pivot clearance in the stanchion. A lock bolt through the cross members and the slot or predrilled holes of each stanchion secures the given stanchion in its angularly adjusted position. An alternative to a slot, is predrilled holes at angles from 20 to 35 degrees. While the two common angles are 20 and 35 degrees, providing holes from 0 to 35 degrees at 5 degree increments has some advantages.

The brackets, attached to a support frame permit vertical adjustments.

DESCRIPTION OF THE PREFERRED EMBODIMENTS

Figure 1:
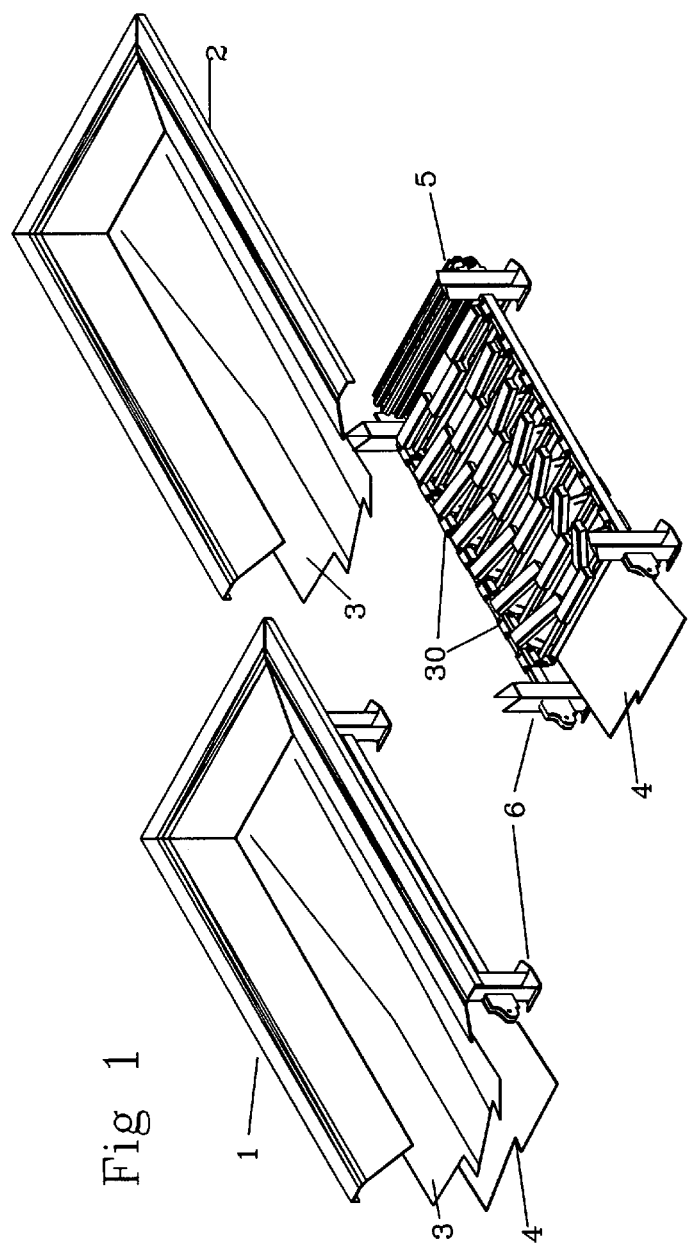
FIG. 1 illustrates the preferred embodiment of the present invention, a conveyor belt support apparatus.
Figure 2:
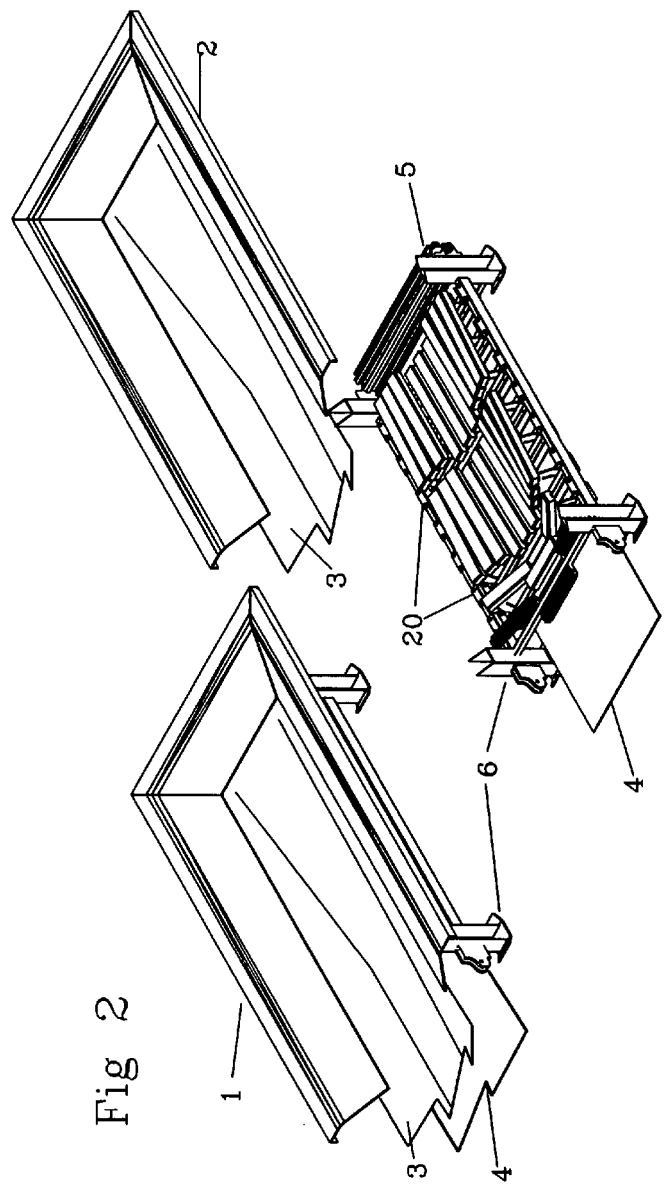
FIG. 2 illustrates the conveyor belt support apparatus with parallel belt troughing slides.
Figure 7:
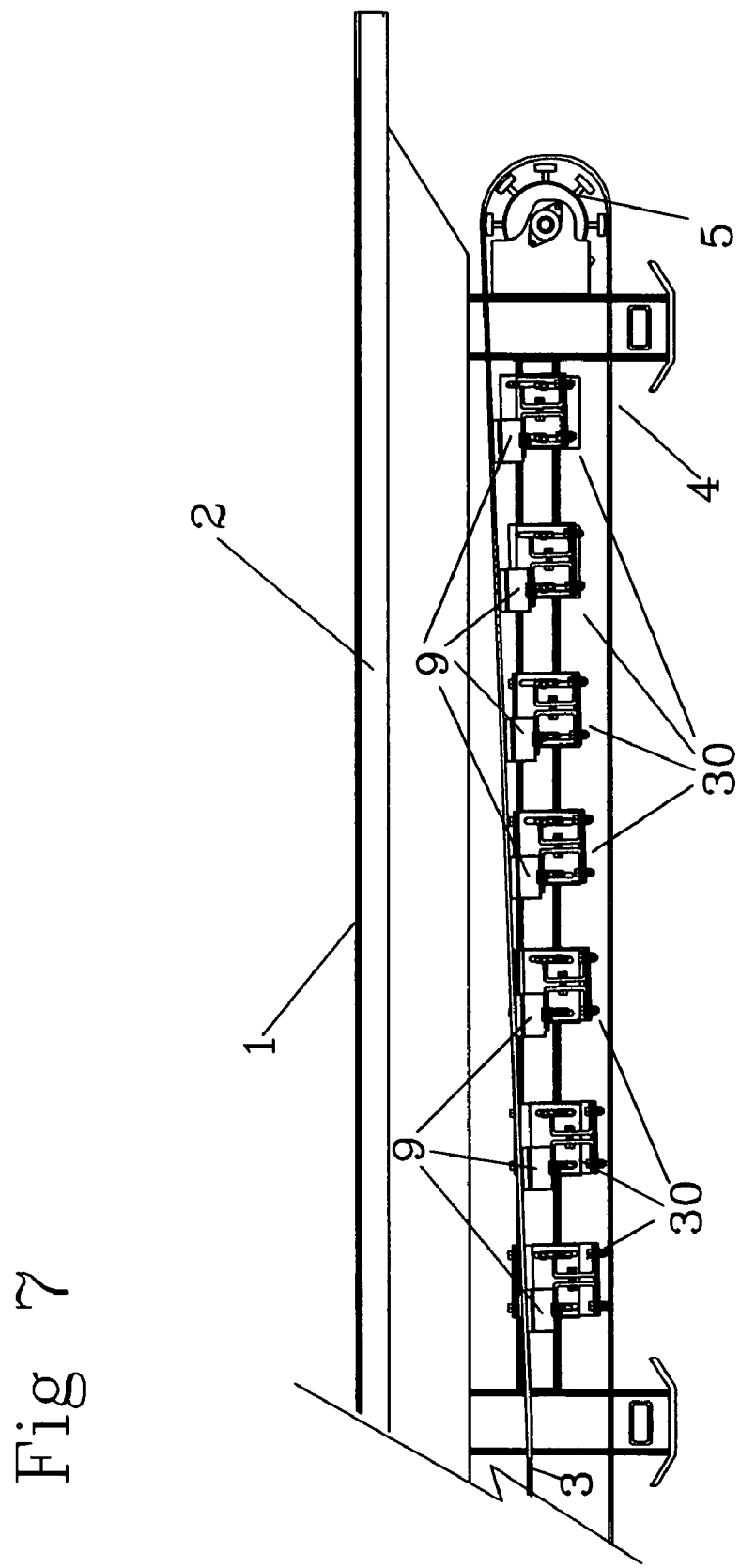
FIGS. 7 and 8 illustrate adjustment means of the conveyor support apparatus.

Referring to FIGS. 1, 2, and 7, the preferred embodiment of the present invention, a conveyor belt support apparatus 1, comprises a hopper 2, top belt 3, return belt 4, belt head roller 5, a modular frame structure 6, and parallel belt troughing slides 20 that support and shape the belt top 3 for transporting material such as coal (not shown).

Referring to FIGS. 3, 4, 5, and 7, the perpendicular belt troughing slides 30, which are an alternative to the parallel belt troughing slides 20 shown in FIG. 2 for shaping the top belt 3, comprise the stanchion assemblies 37, perpendicular slide bars 9, sliding T nut channels 27, and fasteners 28, Each perpendicular slide bar 9 comprises a wear surface 9a, vulcanization adhesion 9b, an impact cushion 9c, which impact cushion 9c further comprises a channel clearance 9d. In the preferred embodiment of the present invention, the wear surface 9a is an ultra high molecular weight polyethylene. The impact cushion 9c, in the preferred embodiment is rubber. The wear surface 9a and a sliding T nut channel 27 within the channel clearance 9d are joined to the impact cushion 9c of the perpendicular slide bar 9 by means of hot press vulcanizing.

The stanchion assembly 37 comprises a right wing cross member 10, a left stanchion 11, a right stanchion 11a, a left wing cross member 12, cross member assembly lock nuts 16, cross member assembly lock bolts 17, upper drop brackets 7, lower drop brackets 8, bracket assembly bolts 21, bracket assembly nuts 21a, lower drop bracket bolts 26, lower drop bracket nuts 31, upper bracket bolts 21, and upper bracket nuts 21a.

Each said stanchion 11 and 11a comprises a curved slot 18, mounting slots 32, and a pivot aperture 19. Said stantions 11 and 11a are bolted between said cross members 10 and 12 by means of the cross member assembly lock nuts 16 and the cross member assembly lock bolts 17. Said lock nuts 16 and lock bolts 17 hold the stanchions 11 in position.

Each of said cross members 10 and 12 comprise lower bracket mounting slots 24. Said cross member 12 further comprises an offset flange 29 with mounting slots 29a.

The left wing cross member 12 further comprises slider bar mounting slots 29.

One perpendicular slide bar 9 is attached to each of said stanchions 11 and 11a by means of bolts 28 through the mounting slots 32 into the sliding T nut channel 27 hot press molded into each of the perpendicular slide bars 9.

A third perpendicular slide bar 9 is attached to the slide bar mounting slots 29a of the offset flange 29 of the left wing cross member 12. This provides for an offset of the third slide bar 9 from the other two perpendicular slide bars 9.

The curved slot 18 of in each of said stanchions 11 and 11a permits angular adjustment of each perpendicular slide bar 9 mounted to each of said stanchions 11 and 11a about the pivot aperture 19 of said stantions 11 and 11a. The purpose of the angular adjustments is to keep material from falling off from the belt top 3.

Each lower drop bracket 8 comprises cross member mounting slots 23 and lower slots 25. The lower drop brackets 8 attach to the right and left cross members 10 and 12 by means of the lower drop bracket bolts 26 through said slots 24 and 25 secured by the lower drop bracket nuts 31.

Each upper drop bracket 7 comprises upper bracket slots 22 and frame mounting slots 33.

The upper drop bracket 7 is assembled to the lower drop bracket 8 by means of said bolts 21 through said slots 22 and 25, secured by said nuts 21a.

The upper drop bracket 7 is attached to the modular frame structure 6 by means of the frame bolts 35 through said slots 33 with the frame nuts 35 securing frame bolts 35 in position.

Figure 6:
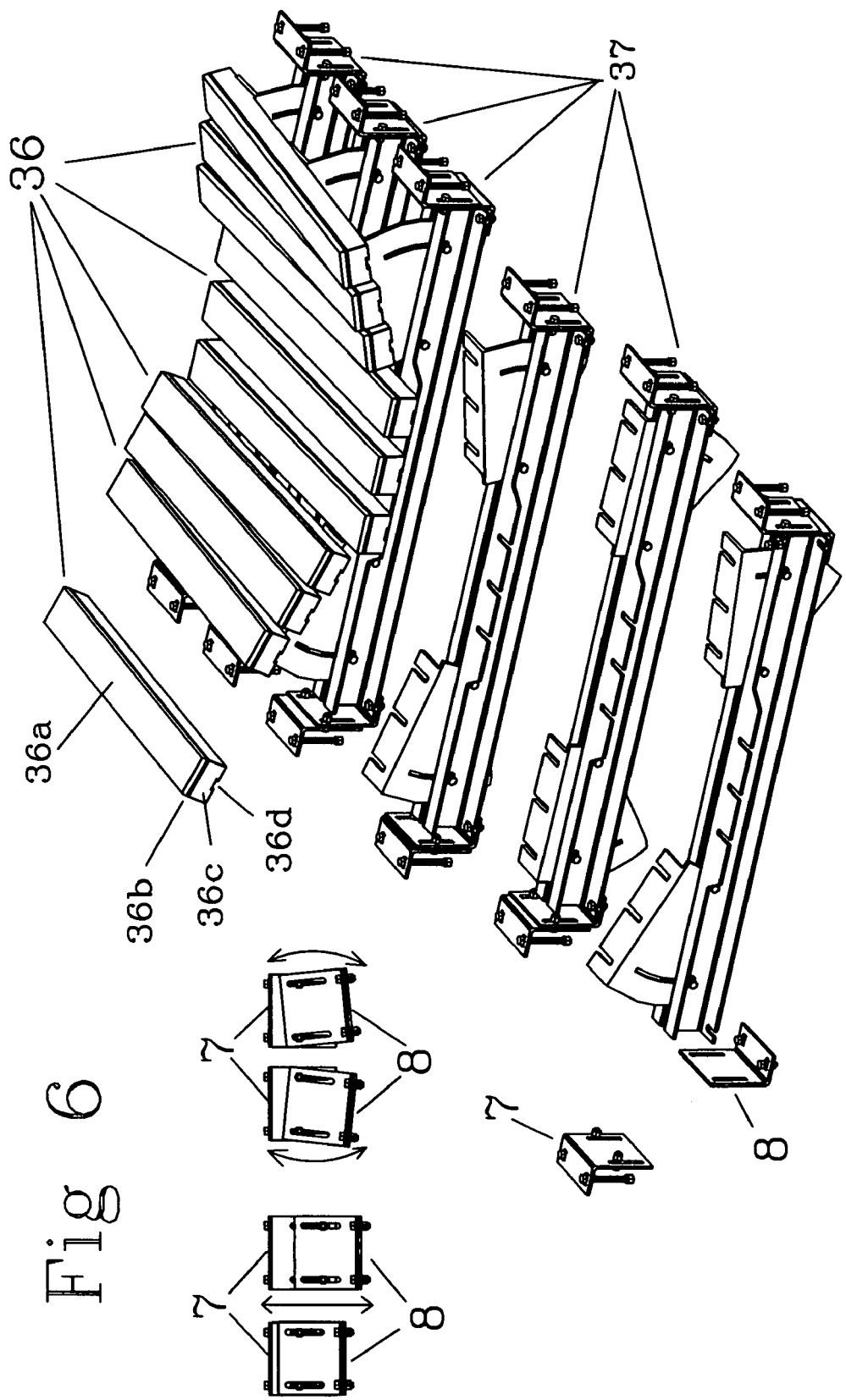
FIG. 6 illustrates the parallel belt troughing slides.

As indicated by the arrows in FIG. 6, said slots 22 and 23 in said brackets 7 and 8, permit vertical height adjustment as well as some rotational adjustment of each of the stanchion assemblies 37 with respect to each other. As said bracket 7 is bolted to said frame 6, and said bracket 8 is bolted to said cross members 10 and 12 the stanchions 37 can be vertically and rotationally adjusted to provide for top belt 3 height adjustments to provide for an inclined top belt 3 as can be viewed in FIG. 7.

Figure 3:
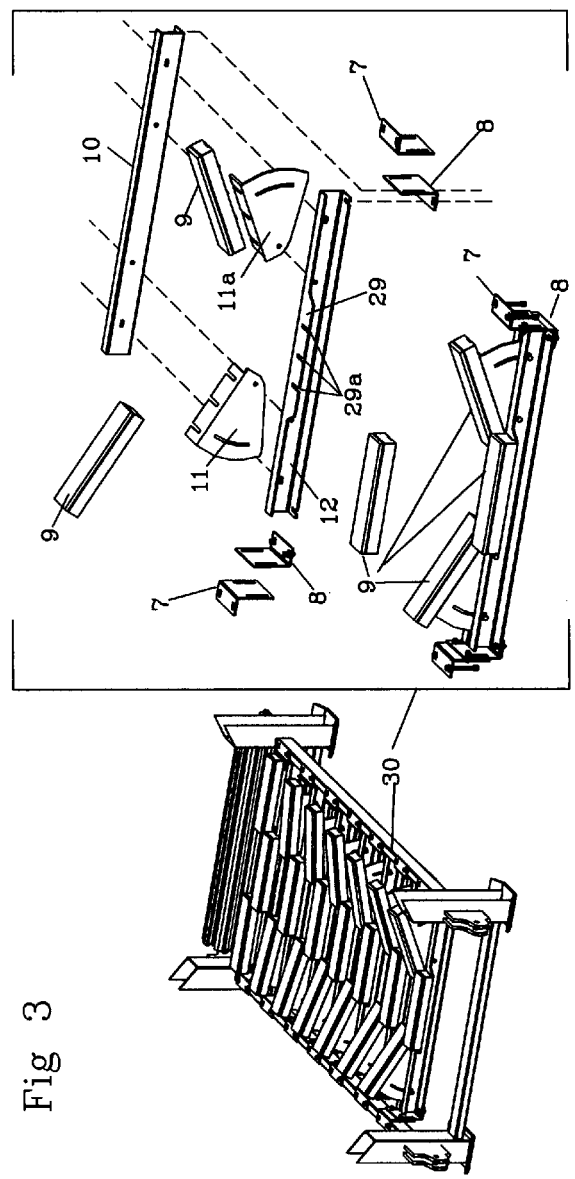
FIG. 3 illustrates the conveyor belt support apparatus with perpendicular belt troughing slides.
Figure 4:
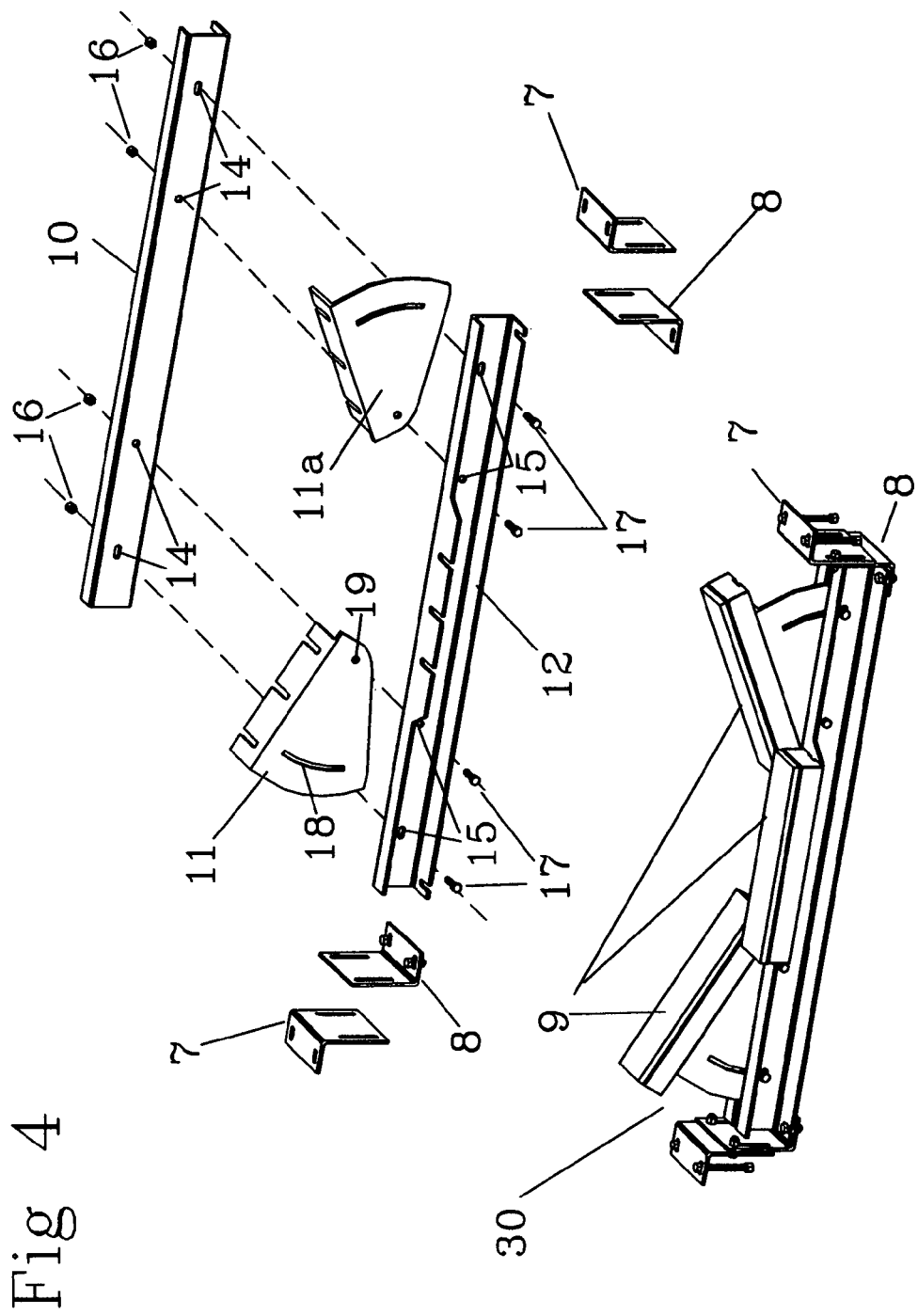
FIGS. 4 and 5 illustrate details of the perpendicular belt troughing slide.

Referring also to FIG. 7, the rotational adjustments of said bracket 7 with respect to said bracket 8, as indicated by arrows in FIG. 6, means said bar 9 can be adjusted so that said bar 9 is in full flat surface support of the top belt 3 which means maximum support for the top belt 3 with minimum wear on the wear surface 9a of said bar 9 (Ref. FIG. 3) from contact with the top belt 3.

FIG. 7 also has a side view of the aforementioned hopper 2.

Figure 8:
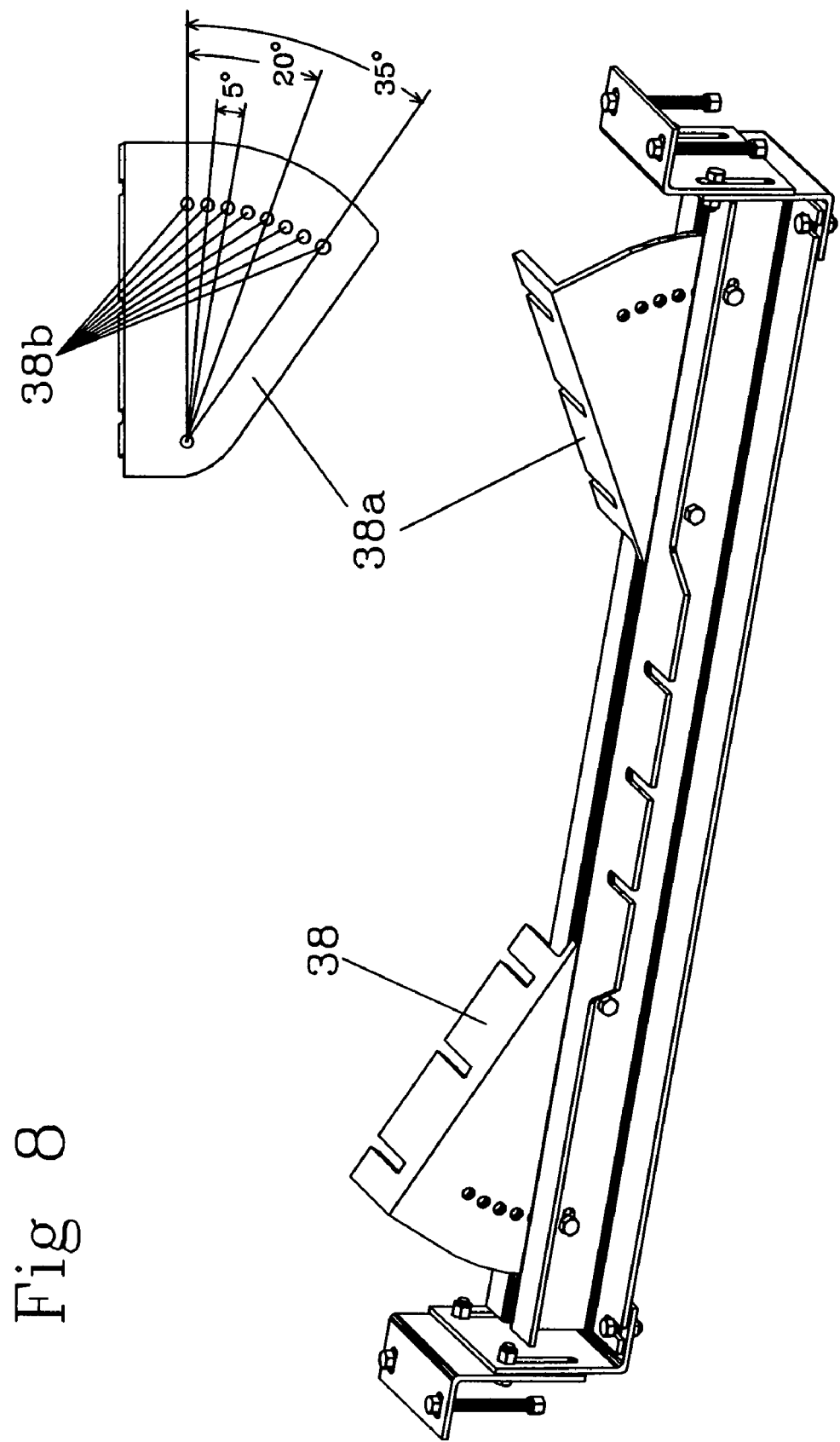

Referring also to FIG. 8, an alternative to the curved slots 12 in said stanchions 11 and 11a to facilitate angular adjustment of the stanchions 11, is pre-drilled holes 38b, as show in the alternative left stanchion 38 and the alternative right stanchion 38a for a more secure positioning of the angular adjustments of said stanchions 38 and 38a, preferably in 5 degree increments from 20 to 35 degrees.

Referring back to FIG. 6, the parallel belt slide bars 36 comprise a slide bar wear surface 36a, a slide bar vulcanization adhesion 36b, an slide bar impact cushion 36c, which slider bar impact cushion 20c further comprising a cushion channel clearance 20d. In the preferred embodiment of the present invention said wear surface 36a is an ultra high molecular weight polyethylene. Said impact cushion 36c is rubber. Said wear surface 36c and sliding T nut channels 27 within said channel clearance 36d are joined to said impact cushion 36c by means of hot press vulcanizing, in the preferred embodiment of the present invention.

Said bars 9 and 36 are mountable, by means of said channels 27 attached to said bars 9 and 36, on said stanchions 11, 11a, 38, and 38a which can be assembled between the cross members 10 and 12.

The design of the cross members 10 and 12 facilitate the use of either of said bars 9 or 36 which may be mounted on any of stanchions 11, 11a, 38, and 38a.

In the alternate preferred embodiment of the present invention, said bars 9 are perpendicular to the direction of top belt 3 travel as opposed said bars 36 which are parallel to the direction of top belt 3 travel.

However, when said bars 36 are parallel to the direction of belt travel, referring to FIG. 8, predrilled holes 38a are a major improvement over said slots 12. Said slots 12 are convenient, so they are the current art. However, the predrilled holes 38a are a major improvement over said slots 12 as bolts through the predrilled holes 38a enable fixing the angular adjustments of the left stachions 38 and the right stanchion 38a in a positive fashion as compared to using the slots 12. The slots 12, while convenient when adjusting the stanchions 11 and 11a, the adjustments change with time and usage, said bolts 17 lose their clamp. Predrilled holes 38a are an important improvement over the slots 12 as well as over the current practice of using a torch to burn in holes as required for field adjustments. Burning holes in metal underground is not safe in methane atmospheres, so conveyor sections are brought out of the coal mine and holes are burned as required above ground.

As indicated in FIG. 8, a range of holes 38b from 20 degrees to 35 degrees on 5 degree increments is a working arrangement that covers most adjustment requirements.

In operation, a normally flat belt 4 can be shaped into a trough shape 3 to hold material such as coal fed onto the belt through a hopper 2. The belt 4 rides on slide bars 9 and 36 on a generally planer wear surface 9a, 36a. The bars 9, 36 are supported by a series of angular adjustable stanchions 11. The angle of successive stanchions 11 can be sequentially changed from 0 degrees giving a flat belt, to 5 degrees, 10 degrees, 15 degrees and so forth giving a progressively deeper trough in the belt 4. The angle of each stanchion 11 can be quickly adjusted using preformed holes 38 B laid out in an arc on each stanchion 11. The bars 9 and 36, when adjusted, form a trough surface as shown in FIG. 1 that supports the belt 4 in a selected shape.

Figure 5:
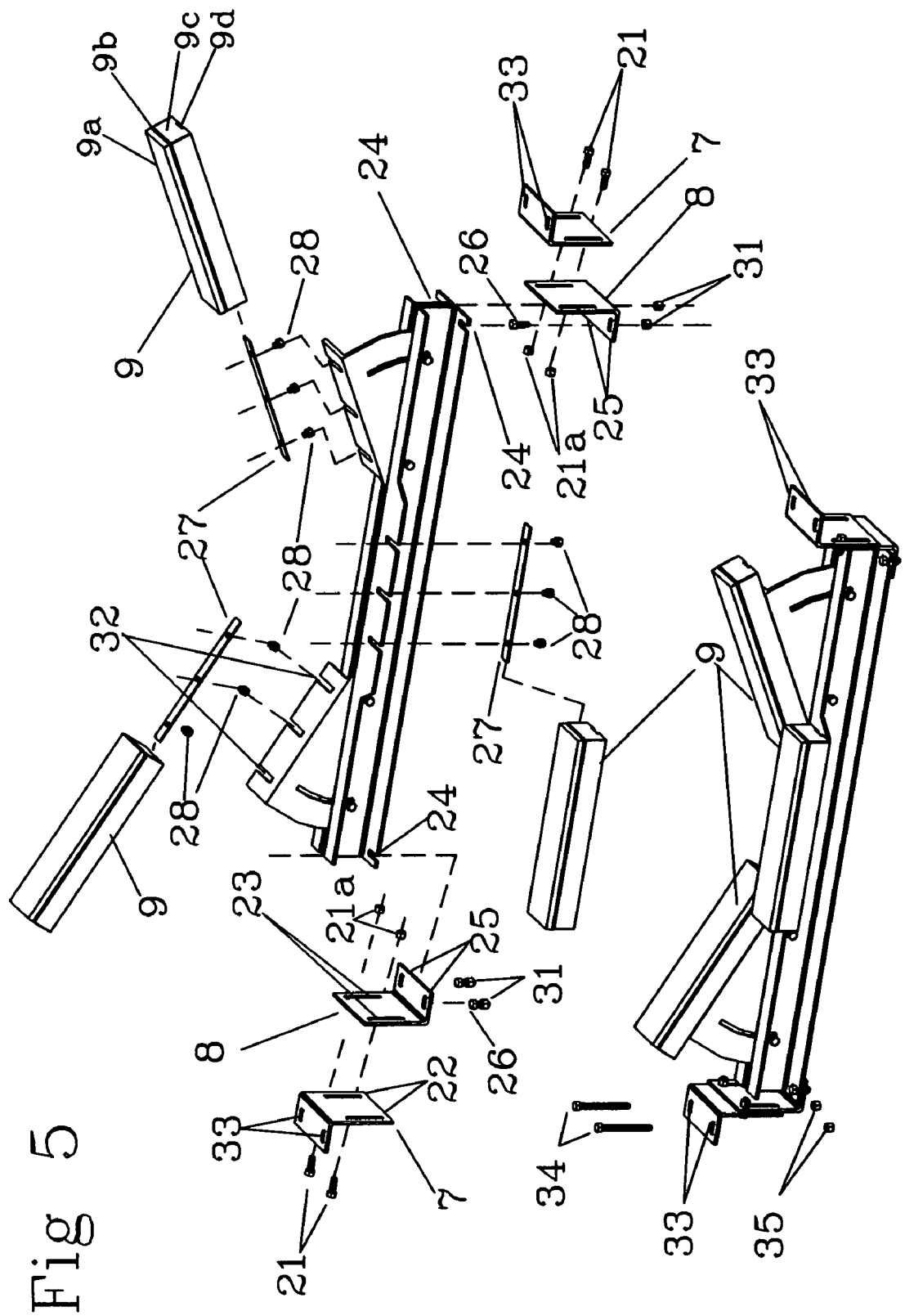

The drop brackets 7 and 8 provide adjustment for a pair of stanchions 11 and 11a on a given stanchion assembly 37. Referring to FIG. 5 a set of three slide bars 9 can be raised or lowered relative to the frame 6 by loosening bolts 21. It is also possible to raise one stanchion 11 higher than the other 11a and to angle the set of slides 9 relative to the belt 4. The slots 22, 23, 25, and 33 allow each stanchion assembly 37 to be raised, lowered, tilted from left to right on the frame 6 and tilted relative to the direction of belt 4 movement and material flow. When combined with the individual adjustment of each stanchion 11, 11a this gives the user extraordinary control over the shape of the trough surface shown in FIG. 1 and of the belt 4 which rests on and takes the shape of the trough surface and thereby allows control of the movement of material on the belt 4.

Although the description above contains many specificities, these should not be construed as limiting the scope of the invention but as merely providing illustrations of some of the presently preferred embodiments of this invention.

The holes 38b could be burned or drilled once the angle was set, or they could be pre-drilled, preferably at five degree increments from 20 to 35 degrees.

It will be obvious to those skilled in the art that modifications may be made to the embodiments described above without departing from the scope of the present invention.

For example, the predrilled holes 38b could be added on site. Also, the holes could be punched or put in some other way, such as burned in by a torch. Also, some other increments than 5 degrees, such as 4 or 6 might be desired. Also, one might decide on some other range than 20 to 35 degrees, such as 0 to 40 degrees.

The combination of a wear surface for wear and an impact cushion for impact, that can be removed and replaced, in an underground methane atmosphere is an improvement of the current practise of having to remove a conveyor section from an underground mine, bring it up to the surface, remove the conveyor's metal slide bars with a cutting torch, weld on replacement metal slide bars, and then transport the conveyor section back into the mine, and reinstall the conveyor section.

The materials of said bars 9 and 20, and the hot press vulcanization to adhere the materials together are defined as preferred embodiments for purposes of enablement. Someday cold adhesives may be developed that supersede hot press vulcanization. Also, other materials, such as a cross linked plastic may develop as a substitute for rubber. Also wear surfaces that are an improvement on ultra high molecular weight polyethylene may be found.

Thus the scope of the invention should be determined by the appended claims in the formal application and their legal equivalents, rather than by the examples given.

The invention claimed is:

1. A conveyor support apparatus comprising;
   a) a belt;
   b) a belt roller;
   c) a frame;
   d) a hopper;
   e) belt troughing slides;
   wherein the belt troughing slides comprise stanchion assemblies and slide bars;
   wherein the stanchion assemblies comprise cross members, stanchions, upper drop brackets, and lower drop brackets;
   wherein the slide bars comprise a wear surface attached to an impact cushion;
   wherein the stanchions are assembled between the cross members;
   wherein the slide bars are adjustably attached to the stanchions;
   wherein the stanchions are angularly adjustable so as to provide a trough for the belt;
   wherein the upper and lower drop brackets are vertically and rotary adjustable with respect to each other;
   wherein the lower drop brackets attach to the cross members of the stanchion assemblies;
   wherein the upper drop brackets attach to the frame resulting in the stanchion assemblies having vertical and rotary adjustment to provide full support of the belt because the upper and lower drop brackets are adjustable with each other.

2. The conveyor support apparatus of claim 1 wherein the upper and lower drop brackets are connected by means of slots in said brackets so as to provide for vertical and rotary adjustment.

3. The conveyor support apparatus of claim 1 wherein;
   a) the slide bars are perpendicular to the belt; and
   b) at least one of the cross members has an offset so that a slide bar may be attached to said offset to provide additional support to the belt.

4. The conveyor support apparatus of claim 1 wherein the slide bars are parallel to the belt.

5. The conveyor support apparatus of claim 1 wherein the slide bar wear surface is hot press vulcanized to the impact cushion.

6. The conveyor support of claim 1 wherein a sliding T nut channel is attached to the slide bar by hot press vulcanization wherein the sliding T nut channel attaches to the stanchion assembly.

7. A conveyor belt support apparatus comprising;
   a belt roller;
   a frame;
   a hopper;
   belt troughing slides;
   wherein the belt troughing slides comprise stanchion assemblies and slide bars;
   wherein the stanchion assemblies comprise cross members, stanchions, mounting brackets;
   wherein the slide bars comprise a planar wear surface attached to an impact cushion;
   wherein the stanchions are mounted to the cross members;
   wherein the slide bars are adjustably attached to the stanchions;
   wherein the stanchions are angularly adjustable so as to provide a trough for the belt;
   wherein the mounting brackets are vertically and rotatably adjustable and mount a stanchion assembly to the frame;
   wherein the mounting brackets attach to the frame resulting in the stanchion assemblies having vertical and rotary adjustment to provide full support of the belt.

8. The conveyor belt support of claim 7 wherein each stanchion assembly is supported by a pair of said mounting brackets one mounting bracket on each end of the stanchion assembly and wherein each mounting bracket includes a lower drop bracket and an upper drop bracket.

9. The conveyor belt support of claim 8 wherein the upper drop bracket is connected to the lower drop bracket by a slotted connection allowing for vertical and rotary adjustment of the stanchion mounting assembly.

10. The conveyor support apparatus of claim 8 wherein;
    at least one of the cross members has an offset so that a slide bar may be attached to said offset to provide additional support to the belt.

11. The conveyor support apparatus of claim 8 wherein the slide bar wear surface is high molecular weight polyethylene hot press vulcanized to the impact cushion which is rubber.

12. A conveyor belt support apparatus comprising;
    a belt roller;
    a frame;
    a hopper;
    belt troughing slides;
    wherein the belt troughing slides comprise stanchion assemblies and slide bars;
    wherein the stanchion assemblies comprise cross members, stanchions, and mounting brackets;
    wherein the slide bars comprise a planar wear surface;
    the stanchions are mounted to the cross members;
    the slide bars are adjustably attached to the stanchions;

the stanchions are angularly adjustable so as to provide a trough surface formed of said slide bar planar surfaces to support the belt;

wherein the mounting brackets are vertically and rotatably adjustable and mount a stanchion assembly to the frame;

wherein the mounting brackets attach to the frame resulting in the stanchion assemblies having vertical and rotary adjustment to provide support of the belt.

13. The conveyor belt support of claim 12 wherein each stanchion assembly is supported by a first mounting bracket on a first end of the stanchion assembly and a second mounting bracket on a second end of the stanchion assembly.

14. The conveyor belt support of claim 13 wherein said first and said second mounting bracket each include a lower drop bracket and an upper drop bracket.

15. The conveyor belt support of claim 14 wherein the upper drop bracket is connected to the lower drop bracket by an adjustable connection allowing for vertical and rotary adjustment of the stanchion mounting assembly.

16. The conveyor support apparatus of claim 15 wherein;

at least one of the cross members has an offset so that a slide bar may be attached to said offset to provide additional support to the belt.

* * * * *